United States Patent
Yoshimura et al.

[11] Patent Number: 5,869,770
[45] Date of Patent: Feb. 9, 1999

[54] CORIOLIZ TYPE MASS FLOWMETER HAVING ISOLATION FORM EXTERNAL VIBRATION

[75] Inventors: Hiroyuki Yoshimura; Takahiro Kudo, both of Kawasaki, Japan

[73] Assignee: Fuji Electric Co., Ltd., Kawasaki, Japan

[21] Appl. No.: 852,682

[22] Filed: May 7, 1997

Related U.S. Application Data

[63] Continuation of Ser. No. 503,998, Jul. 19, 1995.

[30] Foreign Application Priority Data

Jul. 21, 1994 [JP] Japan .................. 6-169378

[51] Int. Cl.⁶ ........................................ G01F 1/84
[52] U.S. Cl. ........................................ 73/861
[58] Field of Search ............... 73/861.355, 861.356, 73/861.357

[56] References Cited

U.S. PATENT DOCUMENTS

| | | |
|---|---|---|
| 3,513,385 | 5/1970 | Pascoe . |
| 3,895,294 | 7/1975 | Vinding . |
| 4,934,196 | 6/1990 | Romano .................. 73/861.38 |
| 5,009,109 | 4/1991 | Kalotay et al. ............ 73/861.38 |
| 5,050,439 | 9/1991 | Thompson . |
| 5,052,231 | 10/1991 | Christ et al. ............ 73/861.356 |
| 5,069,074 | 12/1991 | Young et al. . |
| 5,460,053 | 10/1995 | Lew et al. ............... 73/861.356 |
| 5,469,748 | 11/1995 | Kalotay . |

FOREIGN PATENT DOCUMENTS

| | | |
|---|---|---|
| 0212782 | 3/1987 | European Pat. Off. . |
| 4205300 | 7/1993 | Germany . |
| 4319344 | 1/1995 | Germany . |
| 8802105 | 3/1988 | WIPO . |

*Primary Examiner*—Elizabeth L. Dougherty
*Assistant Examiner*—Harshad Patel
*Attorney, Agent, or Firm*—Greer, Burns, & Crain, Ltd.

[57] ABSTRACT

A first sample hold circuit or S/H, for holding an amplitude value at a predetermined phase of pipe vibration waveform, detected by both sensors and, a second S/H for re-holding the value at the predetermined phase, a comparator for comparing second S/H output with a set value, an differential amplifier for amplifying a difference value thus obtained, and an exciter circuit for increasing and decreasing the vibration amplitude of the pipe responsive to this amplified difference value are provided so as not to cause any change in exciting frequency characteristic, even when outside vibrations are added to the pipe. The present invention enables oscillation waveform to be less distorted and a more stable operation to be achieved even when responsibility, relative to outside vibrations, is increased.

12 Claims, 8 Drawing Sheets

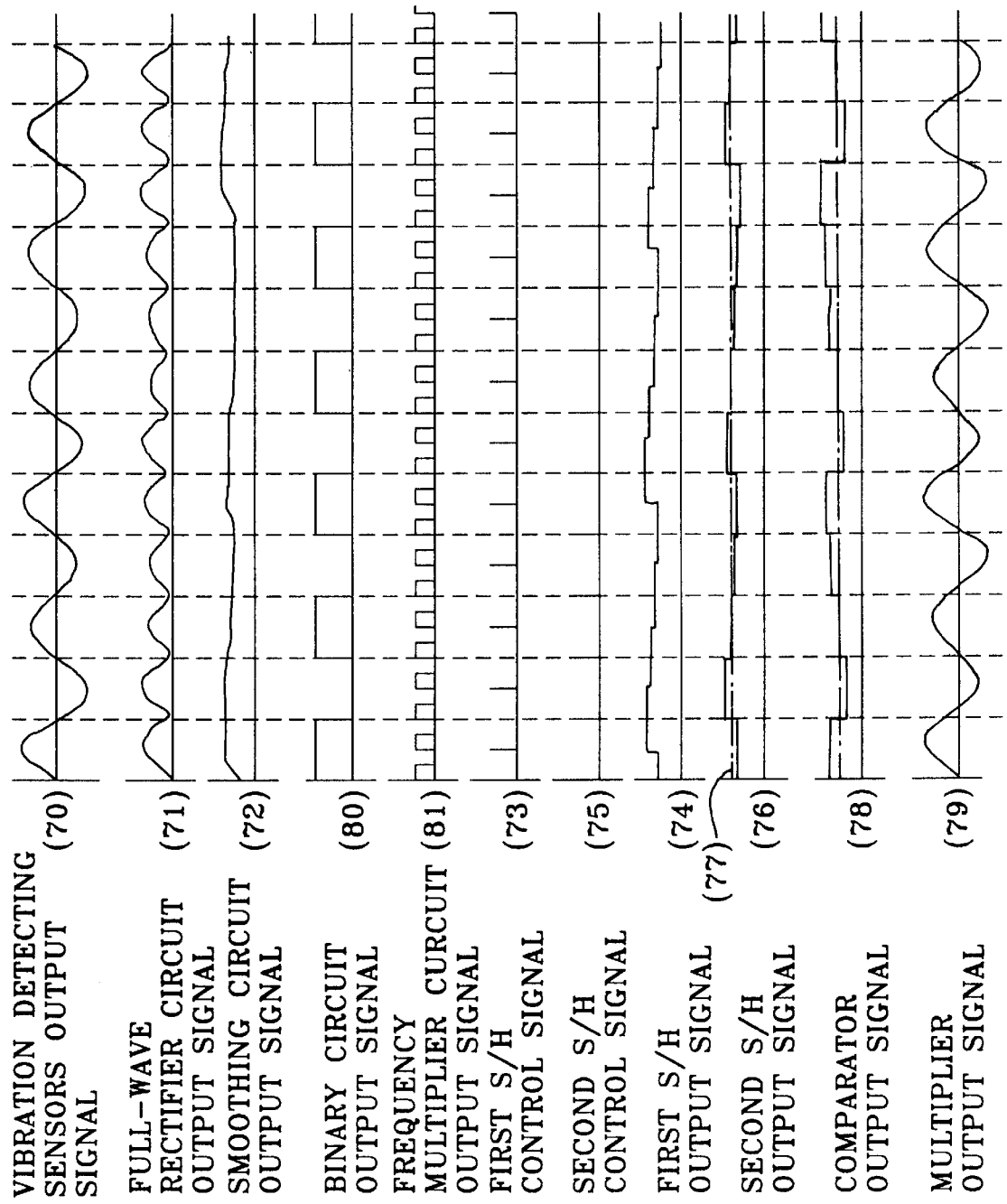

CORIOLIZ TYPE MASS FLOWMETER HAVING ISOLATION FORM EXTERNAL VIBRATION

This application is a continuation of copending application Ser. No. 08/503,998 filed on Jul. 19, 1995.

BACKGROUND OF THE INVENTION

1. Field of the Invention

The present invention relates to a Coriolis type mass flowmeter for detecting a phase difference in a U-shaped pipe vibration, caused by mass fluid in up-stream and down-stream in the pipe by Coriolis force, and measuring flow.

2. Description of the Related Art

FIG. 1 shows the operation principle of a Coriolis type mass flowmeter.

Reference numeral 1 denotes a U-shaped pipe through which fluid to be measured flows. A permanent magnet 2 is fixed to its front end middle portion and both ends of the U-shaped pipe 1 are fixed to a base 3. Numeral 4 represents electromagnetic drive coils 4 installed in such a way that they sandwich the U-shaped pipe 1 between them and numeral 5 denotes a frame for supporting the electromagnetic drive coils. The support frame 5 is firmly fixed to the base 3. The U-shaped pipe 1 is set to vibrate, while taking the base 3 as its cardinal point, (as with the tuning fork), to lose less vibration energy.

Numerals 11 and 12 denote electromagnetic pickups (or vibration detecting sensors) for detecting displacements of both legs of the U-shaped pipe 1. When the U-shaped pipe 1 is driven or excited at its inherent vibration value (sin ωt) by electromagnetic force acting between the drive coils 4 and the permanent magnet 2 which is in opposite to the coils 4 and which is fixed to the U-shaped pipe 1, Coriolis force is generated in fluid flowing through the U-shaped pipe 1.

FIG. 2 shows how the U-shaped pipe 1 is vibrated.

The Coriolis force is proportional to the mass and the velocity of fluid flowing through the U-shaped pipe 1, and its direction is the same as that of a vector product between the moving direction of fluid and the angular velocity at which the U-shaped pipe 1 is excited. Further, the direction of fluid at the U-shaped pipe 1 becomes in reverse between inlet and outlet for fluid. Therefore, torsion torque is caused because of Coriolis force in both legs of the U-shaped pipe 1. This torque changes at the same frequency as the excitation frequency and its amplitude width is proportional to the mass flow rate of fluid. FIG. 3 shows a vibration mode of the U-shaped pipe 1 generated by this torsion torque.

When the amplitude of this torsion vibration torque is detected by the vibration detecting sensors 11 and 12, the mass flow rate of fluid can be found, but, practically, the vibration of the U-shaped pipe 1 becomes in such vibrations that excited vibrations caused by the electromagnetic drive coils are superposed by torsion vibrations caused by Coriolis force, and vibration waveform on the upstream side is expressed by sin (ωt−α) and that on the downstream side by sin (ωt+α). Therefore, signals e1 and e2, detected by the vibration detecting sensors 11 and 12, are expressed as waveforms having a phase difference (Δt), as shown in FIG. 4. This phase difference becomes different, depending upon the pipe used and its excitation frequency. Providing that the U-shaped pipe 1 is used and that its resonance frequency is 80 Hz, for example, a time difference of about 120 μS is caused in the maximum mass flow rate. In the case of conventional mass flowmeters, sensitivity can be increased up to 1/20 of the maximum range, and it is needed in this case that the indicated value of flow rate is guaranteed to an accuracy of 1%. The time difference is 120 μS at the maximum mass flow rate and range and it becomes 6 μS at a 1/20th range, and the accuracy is 1%. Therefore, a time measuring accuracy of 60 μS is needed.

Various methods are used to measure this phase. The simplest method is to count reference clocks in a time difference gate. (See FIG. 5.)

Pickup signals 20 and 21 on up- and down-stream sides are amplified by amplifiers 22 then two-valued by comparators 23, exclusive "OR" of these two-valued signals is calculated by an exclusive "OR" circuit 24, a gate pulse 25, having a pulse width which corresponds to a time difference in the up- and down-stream pickup signals, is thus obtained, and the phase is then measured by counting the number of reference clocks in a gate. The frequency of the reference clock needs to be higher than about 20 MHz.

On the other hand, FIG. 6 shows a drive circuit for the U-shaped pipe, and FIG. 7 shows signal waveforms at respective sections of the circuit.

Output signals from vibration detecting sensors 11 and 12 are passed through a low-pass filter (LPF) 50 to remove high frequency noise. They are then turned to low impedances by a buffer 51 and amplified by an amplifier 52. Further, they are rectified by a full-wave rectifier circuit 53 and smoothed by a smoothing circuit 54 to detect a vibration amplitude level.

This level is compared with a driven amplitude reference level of a reference voltage generator circuit 63 by a comparator 57 and the difference thus obtained is amplified by a differential amplifier 58. This difference voltage (C) is used as control voltage for a multiplier 59. The input of the multiplier 59 is multiplied by signals A*sin wt which have been obtained by filtering and vibration-amplifying signals from the vibration detecting sensors 11 and 12. A signal A*C*sin wt is thus obtained and current is caused to flow in a drive coil 61 through an exciter circuit 60 thereby to control the vibration amplitude of the U-shaped pipe 1. The vibration detecting sensors 11 and 12, LPF 50, buffer 51, amplifier 52, full-wave rectifier circuit 53, comparator 57, difference amplifier 58, exciter circuit 60 and drive coil 61 form a negative feedback control circuit, as described above, and if no vibration is added to the U-shaped pipe from outside, the pipe is driven by a drive waveform of sin wt.

When pump vibration (caused when no fluid flows) and fluid vibration are large, however, the output of the smoothing circuit 54 is expressed by a changing waveform, as shown by signal 72 in FIG. 7, and when this change is amplified by the differential amplifier 58, excitation waveform is not a sine wave but it has many distortions, as seen in signal 79, shown in FIG. 7. When excitation is created by this distorted excitation waveform, the quality of vibration is degraded and the changing at zero point increases.

In order to reduce the distortion of excitation waveform, it is supposed that the time constant of the smoothing circuit 54 is increased. When so arranged, the output of the smoothing circuit 54 becomes difficult to change, and when frequencies of pump and fluid vibrations are low enough, the U-shaped pipe can be vibrated by a less distorted sine wave while reducing the changing at zero point. When their frequencies are high, however, the vibration amplitude of the pipe changes and, in spite of a difference relative to the instruction value, the responsibility of the pipe decreases because the time constant of the smoothing circuit is large.

In short, the pipe cannot be controlled enough so as to remove the difference.

SUMMARY OF THE INVENTION

The object of the present invention is to increase obtain highly resolved response relative to outside vibration, and reduce distortions of oscillation waveform.

According to the present invention, a Coriolis mass flowmeter can be produced wherein fluid is caused to flow through a vibrating pipe, the pipe being torsion-vibrated by Coriolis force generated by the flow of fluid and the angular-velocity-moving pipe. Asymmetrical deflection vibrations of the pipe thus caused are detected by a pair of detectors, and the mass flow rate of fluid flowing through the pipe is obtained from a phase difference between waveforms of outputs applied through the paired detectors, said flowmeter (comprising a sample holding circuit for holding an amplitude value at a predetermined phase of waveforms of pipe vibrations, detected by the detectors), a comparator (for comparing this value held with a set vibration amplitude value), an error amplifier (for amplifying a value thus obtained as a difference value, relative to the vibration amplitude), and an exciter circuit (for increasing and decreasing the vibration amplitude of the pipe, responsive to this difference amplified value).

Further, the phase at which an amplitude value of each waveform of pipe vibrations is detected by the detectors is sampled and held can be set at about 90° or about 270°, at about 90° and about 270°, at about 0° or about 180°, or at about 0° and about 180°.

According to another aspect of the present invention, a Coriolis mass flowmeter can be produced wherein fluid is caused to flow through a vibrating pipe, the pipe being torsion-vibrated by Coriolis force generated by the flow of fluid and the angular-velocity-moving pipe. Asymmetrical deflection vibrations of the pipe thus caused are detected by a pair of detectors, and the mass flow rate of fluid flowing through the pipe is obtained from a phase difference between waveforms of outputs applied through the paired detectors, said flowmeter (comprising a first sample holding circuit for holding an amplitude value at a predetermined phase of each waveform of pipe vibrations, detected by the detectors), a second sample holding circuit for holding at least one every period, the value of the first sample holding circuit at a phase where the time differential value of current flowing into exciter coils becomes the largest, at least once for every cycle, a comparator (for comparing the value held by the second sample holding circuit, with a set vibration amplitude value), an error amplifier (for amplifying a value thus obtained as a difference value, relative to the vibration amplitude), and an exciter circuit (for increasing and decreasing the vibration amplitude of the pipe, responsive to this amplified difference value).

The phase held by the first sample holding cycle holding holding the amplitude value of each waveform of pipe vibrations detected by the detectors, can be set at about 90° or about 270°, and the phase held by the second sample holding circuit can be delayed from the one held by the first sample holding circuit by about 90°. The phase held by the first sample holding circuit can also be set at about 90° and 270°, at 0° or 180°, or at 0° and 180° and the phase held by the second sample holding circuit can be delayed from the one held by the first sample holding circuit by about 90°.

According to the present invention, a value at a specific phase of detected signal waveform is held by the sample holding circuit even when outside vibrations, such as pump and fluid vibrations, are added to the pipe and the vibration amplitude of the pipe is thus disturbed. Amplitude control can therefore be achieved by un-distorted sine-wave excitation to hold the vibration amplitude value certain. A quicker control responsibility can thus be realized. As a result, the frequency of a system, comprising a detecting section, and an exciter circuit section does not change even when outside vibrations are added to the pipe, and it can keep the same characteristic as the frequency characteristic of the detecting section and a more stable flow rate characteristic can be realized. The sample of each detected signal waveform output is held this time at a specific phase. Therefore, control responsibility can be increased while keeping a more stable operation.

According to the present invention, the amplitude value obtained through each vibration detecting sensor is controlled, to become equal to a set value, by the sample holding circuit (for holding the value at a specific phase of each detected signal waveform), by the comparator (for regarding the largest value of each signal detected, relating to the displacement of pipe vibrations as the vibration amplitude of the pipe, and comparing it with a previously set exciting amplitude reference level), by the error amplifier (for amplifying a difference value thus obtained), by the exciter circuit (for causing current to flow into the drive coil while using this amplified difference value as control voltage for a cycle, starting from phase zero of a next cycle), and by the drive coil. Even when outside vibrations (such as pump and fluid vibrations) are added and the vibration amplitude value of the pipe is thus disturbed, therefore, the amplitude control of the pipe is made by the excitation of the sine wave, which has no distortion, to return the vibration amplitude value to the previously set certain value, so that a quicker control responsibility can be realized. In addition, the frequency characteristic of the system, comprising the detector section, and the exciter circuit section, cannot be changed even when outside vibrations are added to the pipe, and it can keep the same frequency characteristic as the detector section detects. A more stable flow rate characteristic can thus be attained.

BRIEF DESCRIPTION OF THE DRAWINGS

The present invention will be more apparent from the following detailed description, when taken in conjunction with the accompanying drawings, in which:

FIG. 9 shows waveforms intended to explain the operation of the circuit shown in FIG. 8.

DETAILED DESCRIPTION OF THE PREFERRED EMBODIMENT

Figure 8A:
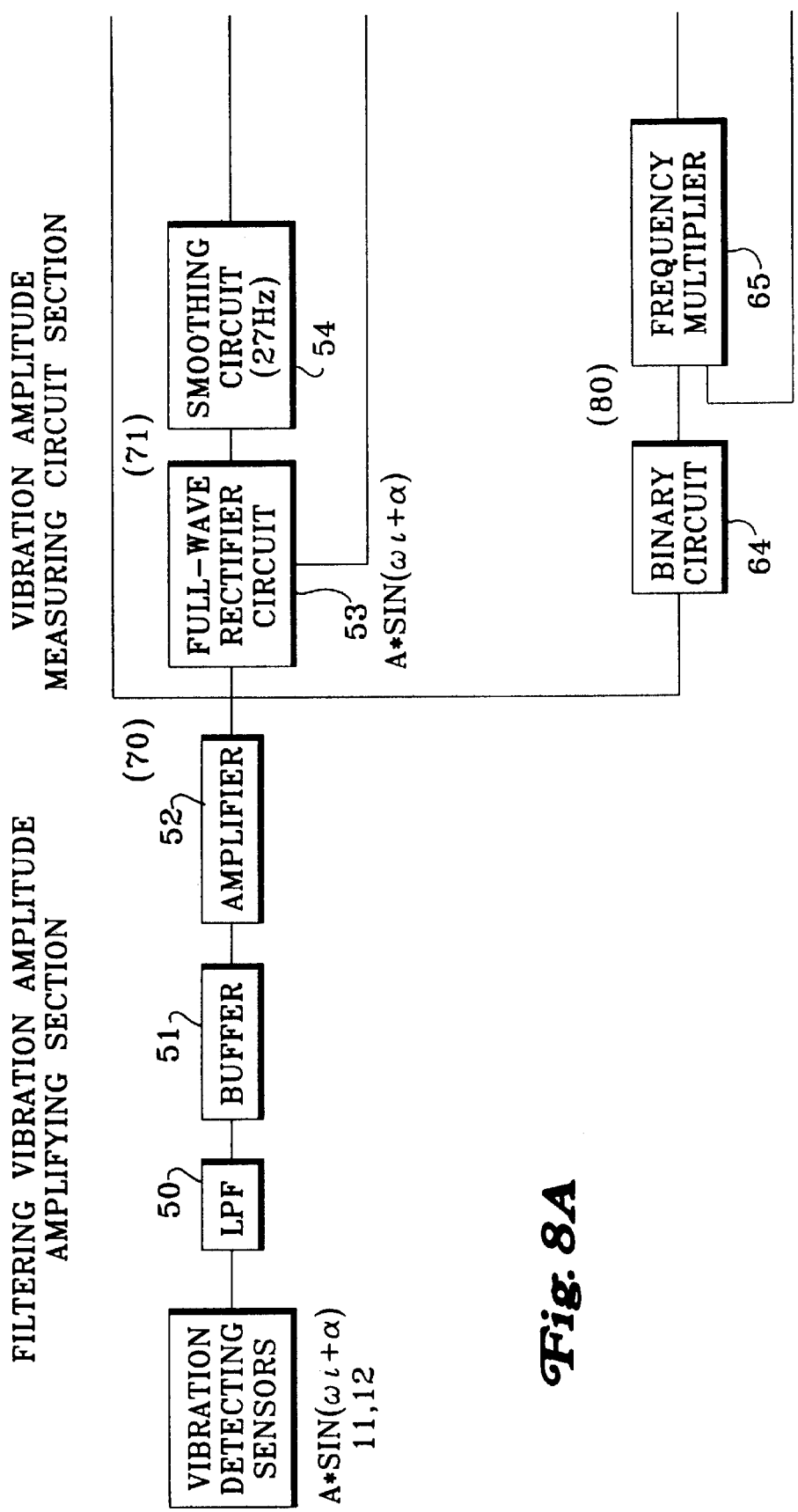
FIG. 8 shows an embodiment of the present invention.
Figure 8B:
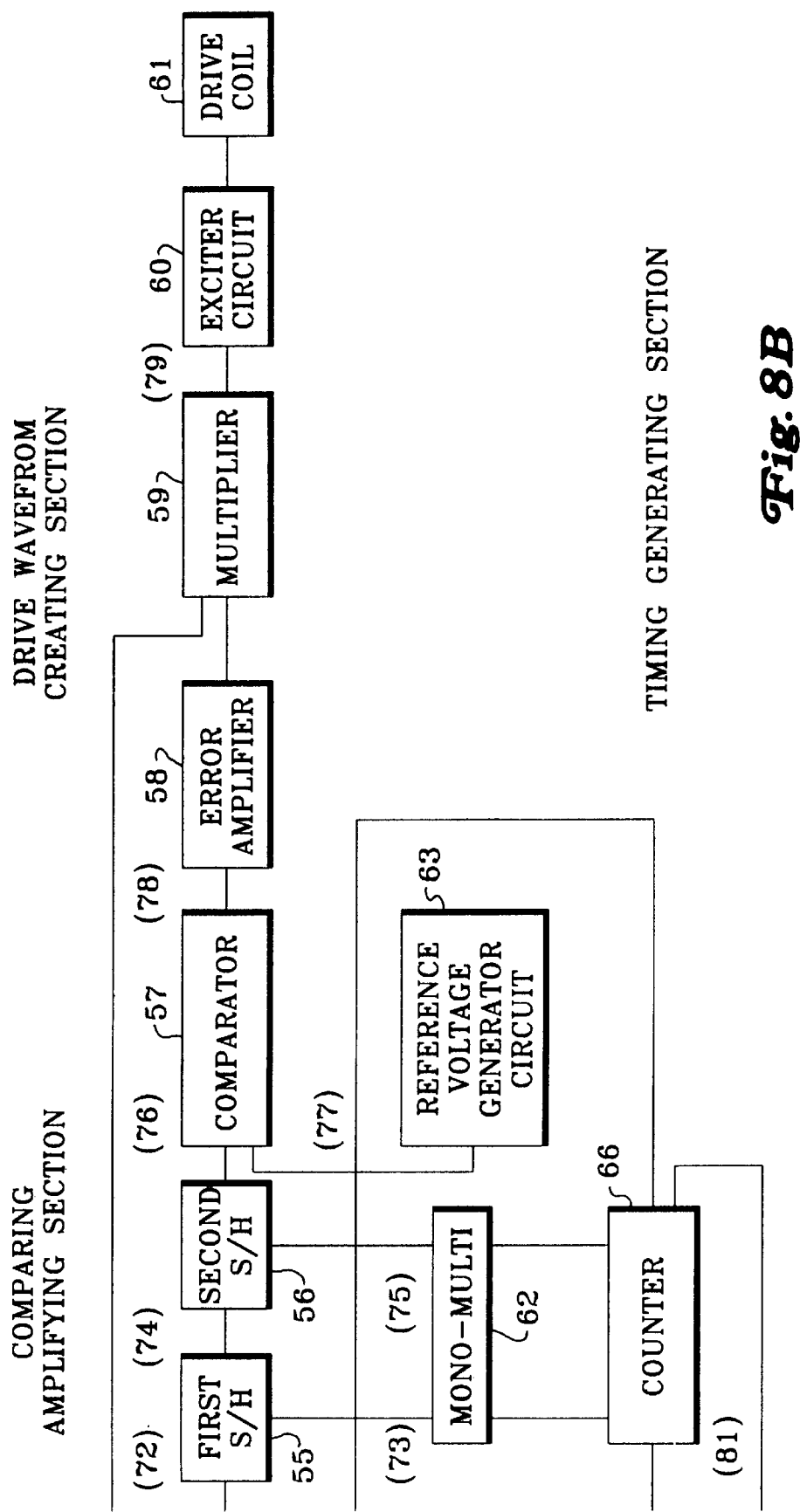
Figure 10:
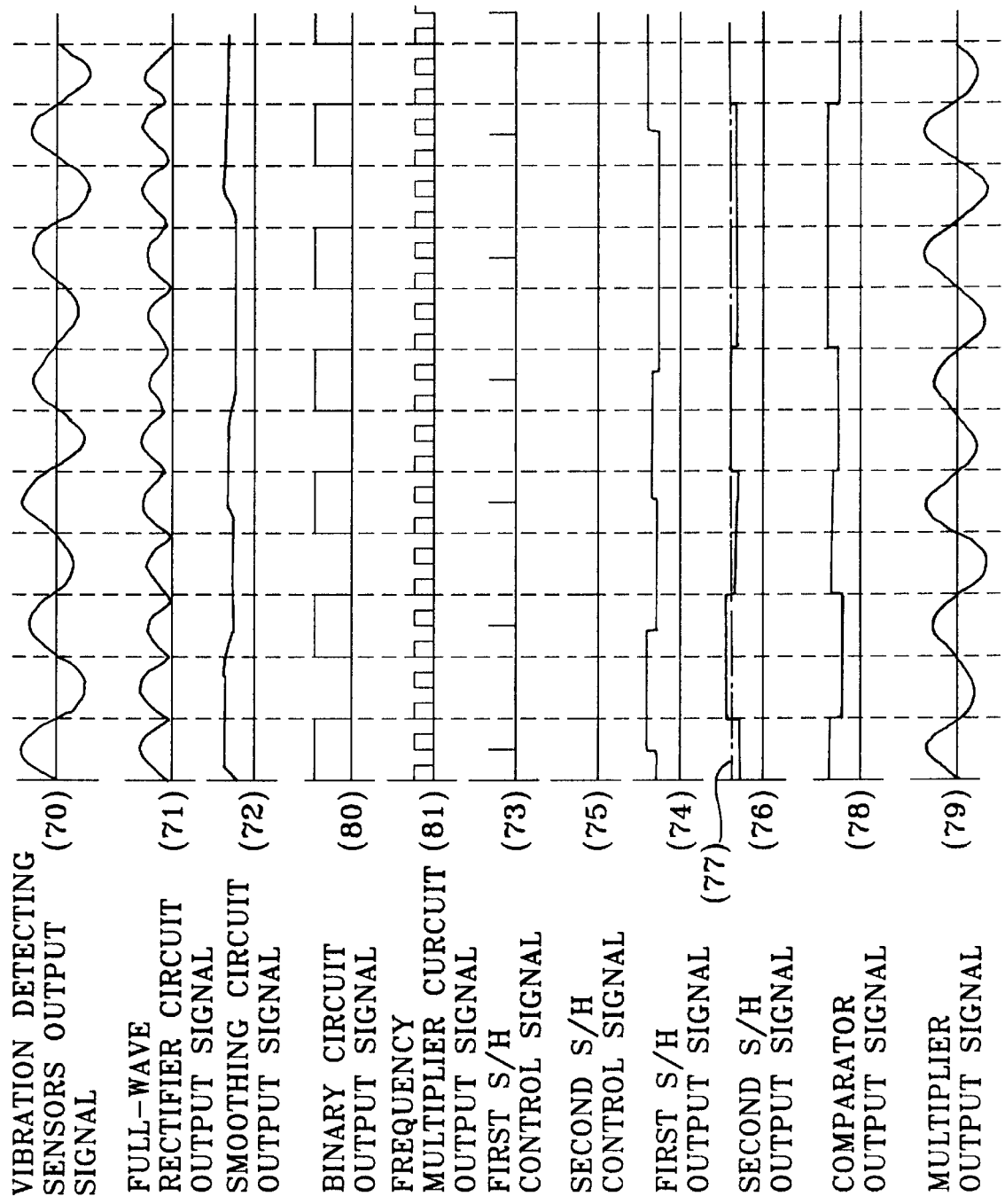
FIG. 10 shows waveforms intended to explain a variation of the circuit shown in FIG. 8.

FIG. 8 is a block diagram showing an embodiment of the present invention and FIGS. 9 and 10 show waveforms at respective sections to explain the operation of the embodiment. In FIG. 9, signal 70 is obtained by filtering and amplifying output signal of a vibration detecting sensor 11 or 12, output signal 71, of a full-wave rectifier circuit 53, output signal 72, of a smoothing circuit 54, output signals 73 and 75, of a monostable multivibrator (or mono-multi) 62, output signal 74, of a first sample holding circuit (S/H) 55, output signal 76, of a second S/H, output signal 78, of a comparator 57, output signal 79, of a multiplier 59, output signal 80, of a binary circuit 64 and output signal 81, of a frequency multiplier 65, are shown. Output signal 77, of a reference voltage generator circuit 63, is shown along with output signal 76, of the second S/H 56.

Figure 1:
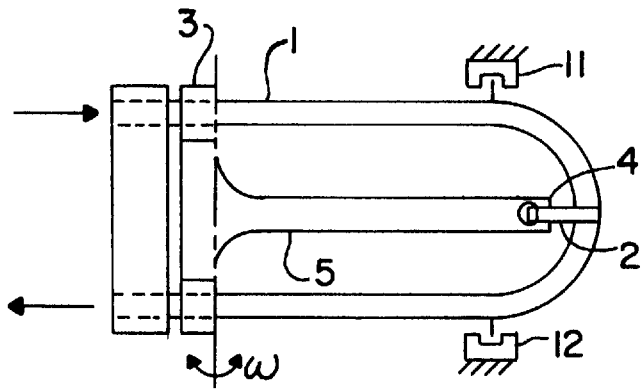
FIG. 1 shows a principle arrangement of the Coriolis type mass flowmeter.
Figure 2:
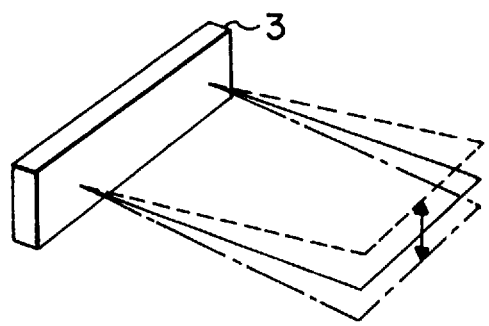
FIG. 2 shows how a U-shaped pipe is vibrated.
Figure 3:
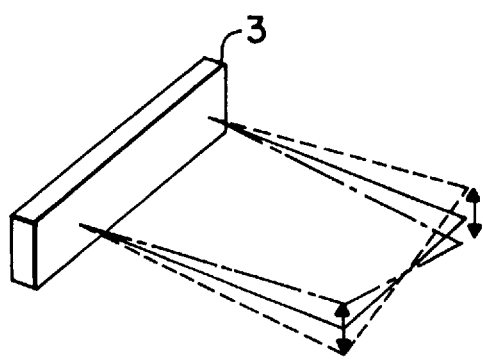
FIG. 3 shows a vibration mode caused by the torsion torque of Coriolis force in the U-shaped pipe.
Figure 4:
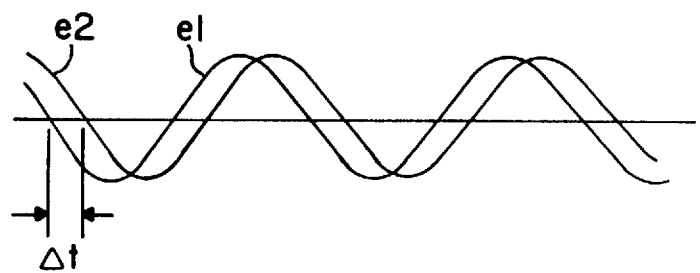
FIG. 4 shows a waveform diagram devoting signals picked up when Coriolis force is generated in the U-shaped pipe.
Figure 5:
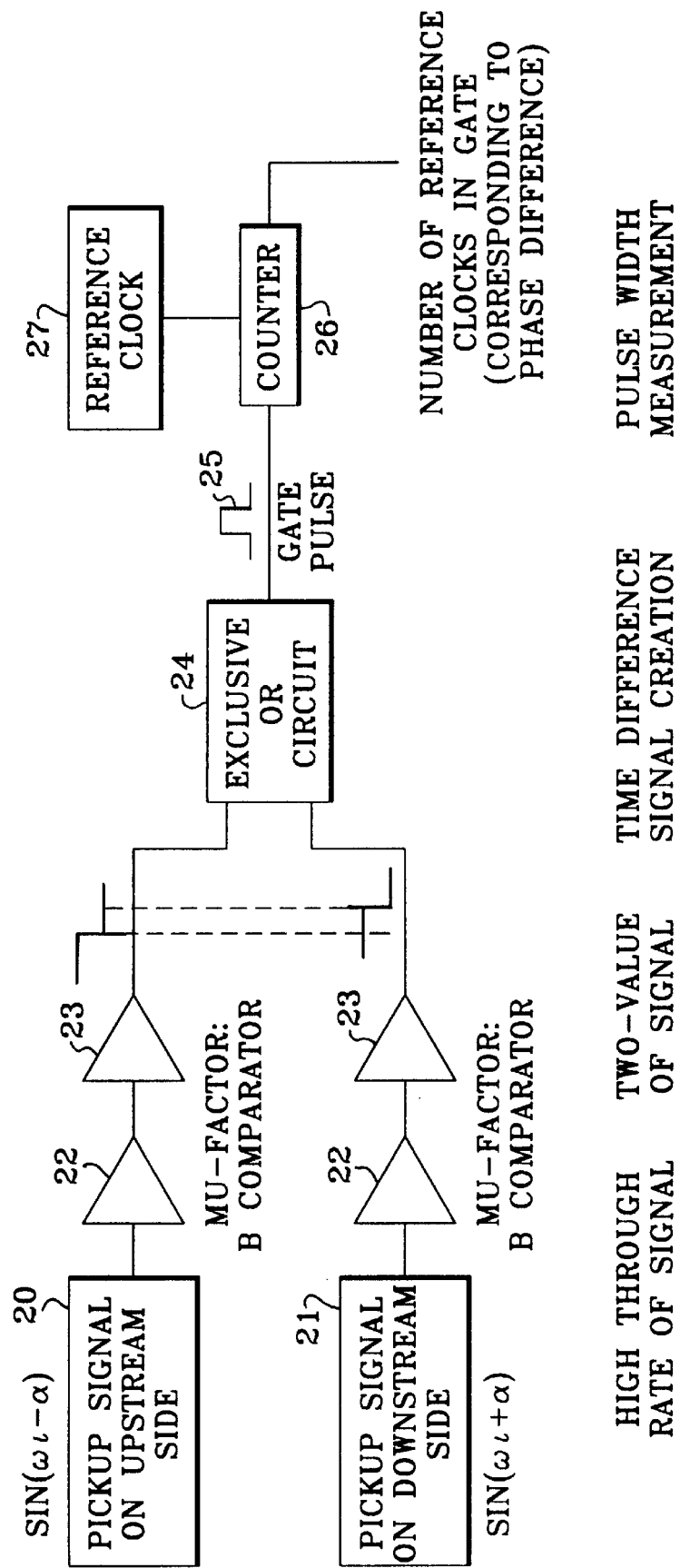
FIG. 5 shows a block diagram devoting a phase difference detector circuit of the counter type.
Figure 6:
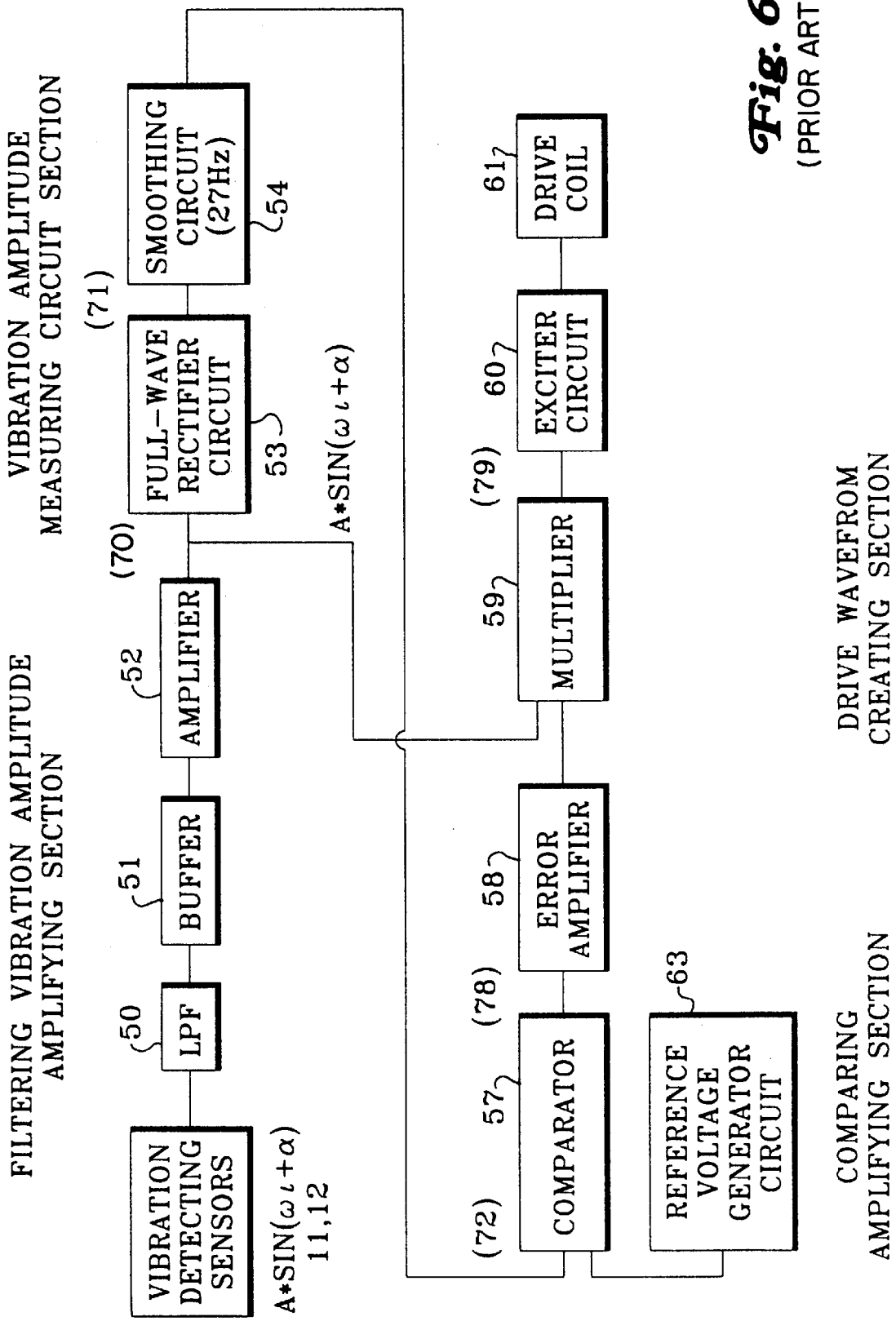
FIG. 6 shows a block diagram devoting the conventional pipe drive circuit.
Figure 7:
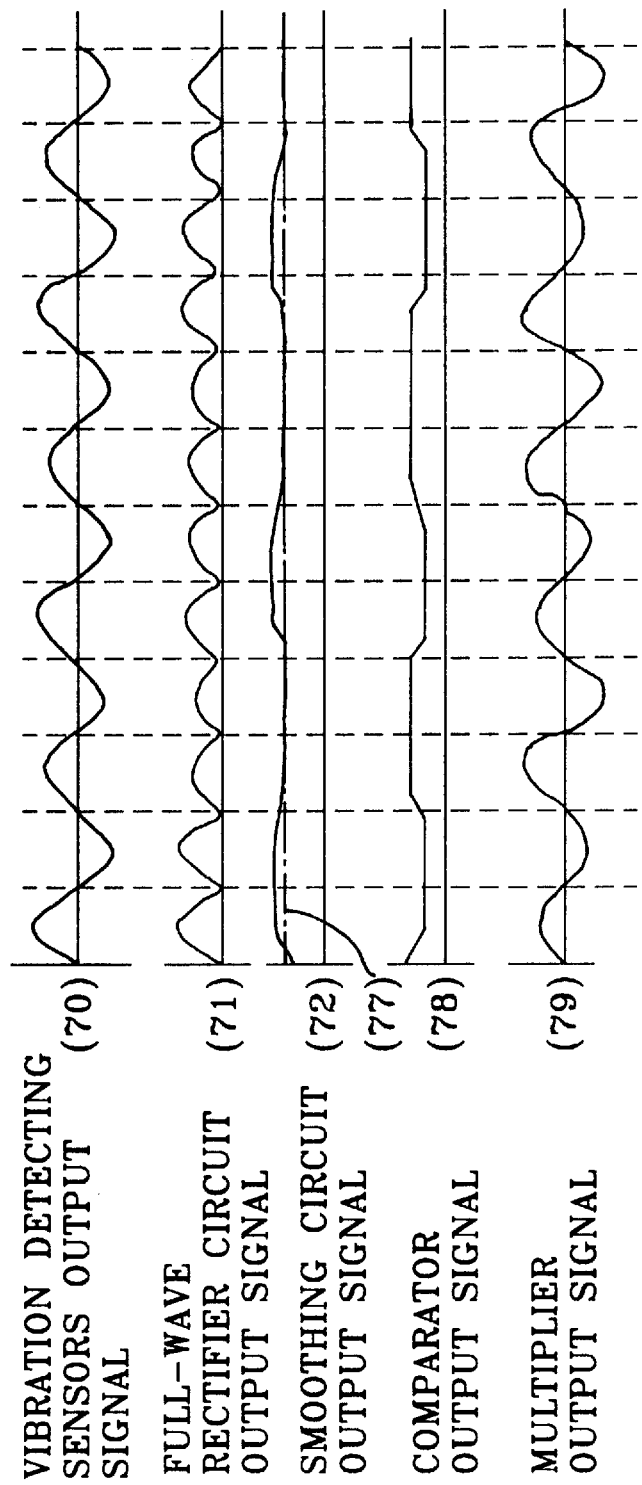
FIG. 7 shows waveforms at respective sections intended to explain the operation of the circuit shown in FIG. 6.

Output signal 70 of the vibration detecting sensor 11 or 12 is passed through a low-pass filter (LPF) 50 to remove high frequency noise, and impedance is lowered by a buffer 51. It is then amplified by an amplifier 52. The output of the amplifier 52 is rectified by the full-wave rectifier circuit 53 to obtain full-wave rectifier circuit output signal 71. This output signal 71 is smoothed by the smoothing circuit 54 which has a relatively small time constant (27 Hz), and smoothing circuit output signal 72 is thus obtained. The process is conducted until the smoothing circuit is the same as the one shown in FIG. 6.

At a timing generating section, output signal 70 of the vibration detecting sensor is converted to digital by the binary circuit 64, increased to four-times frequency by the frequency multiplier 65, counted by a counter 66 and the mono-multi 62 is then excited by outputs of the counter 66. Sample holding control signals 73 and 75 having a phase difference of 90° are thus created to control operations of the first and second S/H 55 and 56.

Therefore, the first S/H 55 holds the smoothing circuit output signal 72 responsive to control signal 73 applied from the mono-multi 62 at a timing of a phase 90° to the output signal wave-form applied from one of the vibration detecting sensors, and it sends this value thus held to the second S/H 56. The second S/H 56 maintains the value held by the first S/H 55 responsive to control signal 75 applied from the mono-multi 62 at a timing of a phase 180° to the output signal waveform applied from the other vibration detecting sensors, and it sends the value, thus maintained to the comparator 57 at the next stage.

The value held by, and applied from, the second S/H 56, is compared with a drive amplitude reference level 77 in the reference voltage generator circuit 63 by the comparator 57. The differential amplifier 58 amplifies a difference of both values and sends it as control voltage C to the multiplier 59. The multiplier 59 multiplies this comparator output 78 and the output signal from the vibration detecting sensors 11 and 12, to obtain signal A*C*sin ωt, and sends it to the exciter circuit 60. The exciter circuit 60 causes current, which is proportional to A* C*sin ωt, to flow into a drive coil (or electromagnetic drive coil) 61, so that the vibration amplitude of the pipe can be controlled.

As apparent from the above, a negative feedback sample holding control circuit is created by the vibration detecting sensors 11 and 12, LPF 50, buffer 51, amplifier 52, full-wave rectifier circuit 53, first S/H 55, second S/H 56, comparator 57, error amplifier 58, multiplier circuit 59, exciter circuit 60 and drive coil 61.

In the embodiment shown in FIG. 8, the smoothing circuit output signal 72, which represents the vibration amplitude value is sampled and held at a first specific phase and the value thus held is also sampled and held at a second specific phase in a following cycle of the first sample hold, even when pump and fluid vibrations are large. During this cycle, therefore, the first sample hold value is maintained by the second sample hold. The value of difference voltage (or control voltage) C is thus ascertained and the multiplier output signal 79 is ascertained and the multiplier output signal 79 is obtained by multiplying output signals of the vibration detecting sensors by comparator output value, which is certain during one cycle. The pipe can thus be excited by sine wave, which is not distorted in any cycle and which has a higher frequency purity.

In the embodiment shown in FIG. 8, the phase of the first sample hold has been set at 90° or 270° of the output signal waveform of the vibration detecting sensor 11 or 12 and the phase of the second sample hold has been delayed from the one of the first sample hold by 90°. However, the phase of the first sample hold can also be set at 90° and 270°, at 0° or 180°, or at 0° and 180°. Depending upon whether the vibration detecting sensors are used as speed or position ones, a phase difference of 90° is caused in the former case, and no phase difference is caused in the latter case. The reason why 90° and 270° are used instead of 90° or 270°, and 0° and 180° instead of 0° or 180°, is because high response speed should be obtained.

Further, the sample hold circuit has been divided into first and second S/H in FIG. 8, but the second S/H 56 can be omitted. However, no changeover is made at positions of 0° and 180° of the sine-wave-like phase of the multiplier output signal. Therefore, waveform is changed over, with step form at a change point one at a time, when the value held by the first S/H 55 is re-newed. As seen in the above, the phase holding the amplitude value of pipe vibration waveform, detected by each vibration detecting sensor, is set at about 90° or about 270°, at about 90° and about 270°, at about 0° or about 180°, or at about 0° and about 180°.

What is claimed is:

1. An apparatus for measuring mass flow of flowing fluid through a vibrating pipe, by detecting asymmetrical flexural oscillation of the pipe through a pair of detectors, and determining said mass flow by comparing the phase difference between output waves of said detectors, comprising:

a timing generation means responsive to the output of the detectors;

a voltage generating means for generating a preset vibration amplitude value;

a sample and hold means for sampling and holding an amplitude value of the pipe vibration waves, at a time determined by said timing generation means;

a comparing means for comparing said held amplitude value with said preset vibration amplitude value;

an error amplification means for amplifying said compared value of said comparing means, as an error value; and a vibration means for adjusting the pipe vibration amplitude value, based on said error value output from said error amplification means.

2. The apparatus defined in claim 1, wherein said sample and hold means samples and holds a pipe vibration wave amplitude value at a phase of the detected vibration wave selected from the group comprising values around 90 and 270 degrees.

3. The apparatus defined in claim 1, wherein said sample and hold means samples and holds a pipe vibration wave amplitude value first at a phase of the detected vibration wave having a value around 90 degrees, and second at a phase having a value around 270 degrees.

4. The apparatus defined in claim 1, wherein said sample and hold means samples and holds a pipe vibration wave amplitude value at a phase of the detected vibration wave selected from the group comprising values around 0 and 180 degrees.

5. The apparatus defined in claim 1, wherein said sample and hold means samples and holds a pipe vibration wave amplitude value first at a phase of the detected vibration wave having a value around 0 degrees, and second at a phase having a value around 180 degrees.

6. An apparatus for measuring mass flow of flowing fluid through a vibrating pipe, by detecting asymmetrical flexural oscillation of the pipe through a pair of detectors, and determining said mass flow by comparing the phase difference between output waves of said detectors, comprising:

a timing generation means responsive to the output of the detectors;

a voltage generating means for generating a preset vibration amplitude value;

first sample and hold means for sampling and holding an amplitude value of the pipe vibration waves, at a time determined by said timing generation means;

second sample and hold means for sampling and holding the value of said first sampling and holding means, at least one time per periods at a phase at which a time differential value for an input current of a pipe exciting coil is maximum;

a comparing means for comparing said held value of said second sampling and holding means with a preset vibration amplitude value generated by said voltage generating means;

an error amplification means for amplifying said compared value of said comparing means, as an error value; and a vibration means for increasing or decreasing pipe vibration amplitude value, based on said error value output from said error amplification means.

7. The apparatus defined in claim 6, wherein said first sample and hold means samples and holds an amplitude value of the pipe vibration waves at a phase of the detected vibration wave selected from the group comprising values around 90 and 270 degrees, and said second sample and hold means samples and holds an amplitude value of the pipe vibration waves at a phase delayed about 90 degrees in relation to said holding phase of said first sample and hold means.

8. The apparatus defined in claim 6, wherein said first sample and hold means samples and holds the amplitude value of the detected pipe vibration waves twice, first at a phase having a value around 90 degrees, and second at a phase having a value around 270 degrees, and a holding phase of said second sample and hold means samples and holds an amplitude value of the pipe vibration waves at a phase delayed about 90 degrees in relation to said holding phases of said first sample and hold means.

9. The apparatus defined in claim 6, wherein said first sample and hold means samples and holds an amplitude value of the pipe vibration waves is sampled and held in said first sample and hold step at a phase of the detected vibration wave selected from the group comprising values around 0 and 180 degrees, and said second sample and hold means samples and holds an amplitude value of the pipe vibration waves at a phase delayed about 90 degrees in relation to said holding phase of said first sample and hold means.

10. The apparatus defined in claim 6, wherein said first sample and hold means samples and holds the amplitude value of the detected pipe vibration wave twice, first at a phase having a value around 0 degrees, and second at a phase having a value around 180 degrees, and said second sample and hold means samples and holds an amplitude value of the pipe vibration waves at a phase delayed about 90 degrees in relation to said holding phases of said first sample and hold means.

11. A method of measuring mass flow of flowing fluid through a vibrating pipe by detecting asymmetrical flexural oscillation in the pipe through a pair of detectors, and determining said mass flow, by comparing the phase difference between output wave of said detectors, comprising the steps of:

sampling and holding, at a time specified by a timing generation means responsive to the phase of the pipe vibration wave, an amplitude value of the pipe vibration waves detected by said detectors;

comparing said held amplitude value with a preset vibration amplitude value generated by a voltage generating means;

amplifying said compared value, as an error value; and increasing or decreasing pipe vibration amplitude value, based on said error amplitude value.

12. A method of measuring mass flow of flowing fluid through a vibrating pipe, by detecting asymmetrical flexural oscillation through a pair of detectors, and determining said mass flow by comparing the phase difference between output waves of said detectors, comprising the steps of:

first sample and hold step for sampling and holding, at a time specified by a timing generation means responsive to the phase of the pipe vibration wave, an amplitude value of the vibration waves detected by said detectors;

second sample and hold step for sampling and holding a value of said first sampling and hold step, at least one time per period, approximately at a phase at which a time differential value for an input current of a pipe exciting coil is maximum;

a comparing step for comparing a held value of said second sampling and holding means with a preset vibration amplitude value generated by a voltage generating means;

an error amplification step for amplifying said compared value, as an error value; and a vibration step for increasing or decreasing pipe vibration amplitude value, based on said error value of said error amplification step.

* * * * *

UNITED STATES PATENT AND TRADEMARK OFFICE
CERTIFICATE OF CORRECTION

PATENT NO. : 5,869,770
DATED : February 9, 1999
INVENTOR(S) : Yoshimura et al.

It is certified that error appears in the above-identified patent and that said Letters Patent is hereby corrected as shown below:

On the Face of the Patent:

Under "[54] Title", delete "CORIOLIZ" and insert --CORIOLIS-- therefor

Under "[54] Title", delete "FORM" and insert --FROM-- therefor

Column 5, line 3, delete " amplifying" and insert -- amplitude-amplifying-- therefor Column 6, line 29, delete "one at a time"

Signed and Sealed this

Eleventh Day of January, 2000

Attest:

Q. TODD DICKINSON

*Attesting Officer*    *Acting Commissioner of Patents and Trademarks*